(12) United States Patent
Mori et al.

(10) Patent No.: US 6,333,772 B1
(45) Date of Patent: Dec. 25, 2001

(54) LCD WITH BIMETAL SWITCH BETWEEN PANEL AND HEAT SINK FOR REGULATING TEMPERATURE OF PANEL

(75) Inventors: Shigeki Mori, Atsugi; Takayuki Ishii, Hiratsuka, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/475,176

(22) Filed: Dec. 30, 1999

(30) Foreign Application Priority Data

Jan. 6, 1999 (JP) .................................................. 11-001492

(51) Int. Cl.$^7$ ................................................ G02F 1/1333
(52) U.S. Cl. ............................................................ 349/161
(58) Field of Search ....................... 349/161, 72; 337/16, 337/333

(56) References Cited

U.S. PATENT DOCUMENTS

| | | | |
|---|---|---|---|
| 4,157,932 | 6/1979 | Hirata | 156/310 |
| 4,687,315 | * 8/1987 | Fujii | 355/3 FU |
| 4,848,879 | 7/1989 | Nishimura et al. | 350/353 |
| 5,051,784 | 9/1991 | Yamamoto et al. | 355/285 |
| 5,197,892 | 3/1993 | Yoshizawa et al. | 439/91 |
| 5,266,774 | 11/1993 | Kimura et al. | 219/216 |
| 5,300,999 | 4/1994 | Koh et al. | 355/289 |
| 5,401,936 | 3/1995 | Kasaka et al. | 219/216 |
| 5,552,582 | 9/1996 | Abe et al. | 219/619 |
| 5,629,788 | 5/1997 | Mori et al. | 349/172 |
| 5,656,187 | 8/1997 | Miyamoto et al. | 219/216 |
| 5,786,879 | 7/1998 | Kodera et al. | 349/134 |
| 5,790,223 | 8/1998 | Hanyu et al. | 349/184 |
| 5,815,230 | 9/1998 | Miura et al. | 349/129 |
| 5,875,096 | * 2/1999 | Gates | 361/704 |
| 5,877,836 | 3/1999 | Miura et al. | 349/184 |
| 5,885,482 | 3/1999 | Asaoka et al. | 252/299.01 |
| 6,035,155 | 3/2000 | Kaji et al. | 399/69 |
| 6,163,359 | * 12/2000 | Smith et al. | 349/161 |
| 6,278,607 | * 8/2001 | Moore et al. | 361/687 |

\* cited by examiner

*Primary Examiner*—Toan Ton
*Assistant Examiner*—Andrew Schechter
(74) *Attorney, Agent, or Firm*—Fitzpatrick, Cella, Harper & Scinto

(57) ABSTRACT

A liquid crystal apparatus is constituted by a liquid crystal panel, illumination means for illuminating the liquid crystal panel, a heat dissipation member disposed with a spacing from the liquid crystal panel, and a heat conductive member. The apparatus further includes a heat deformation member which is disposed contactable to the heat conductive member and is deformable on receiving heat from the liquid crystal panel, so as to have the heat conductive member contact both the liquid crystal panel and the heat dissipation member thereby forming a heat conductive path between the liquid crystal panel and the heat dissipation member in a first position at a temperature of at least a prescribed temperature of the liquid crystal panel and to have the heat conductive member be separated from at least one of the liquid crystal panel and the heat dissipation member in a second position at a temperature below the prescribed temperature.

14 Claims, 2 Drawing Sheets

LCD WITH BIMETAL SWITCH BETWEEN PANEL AND HEAT SINK FOR REGULATING TEMPERATURE OF PANEL

FIELD OF THE INVENTION AND RELATED ART

The present invention relates to a liquid crystal apparatus including a liquid crystal device for displaying various data or information by utilizing a liquid crystal and particularly a liquid crystal apparatus in which a liquid crystal device is appropriately temperature-controlled by utilizing a specific heat deformation member.

Among display apparatus as information exchange means based on human senses, a liquid crystal (display) apparatus excellent in mobility or portability and in energy-saving performance has attracted considerable attention in the present multimedia society and has been extensively developed next to semiconductor devices.

More specifically, as the liquid crystal apparatus, a display apparatus for a notebook-type personal computer has widely been popularized or a light valve for a projector has been tried to be used extensively for realizing large-area display.

Such a liquid crystal apparatus, however, has encountered a problem such that a response speed of a liquid crystal becomes too slow to display high-quality images when the liquid crystal apparatus is driven at a considerably lower temperature. Further, in order to effect high-luminance display, it is necessary to illuminate a liquid crystal panel device) with light having a large luminous energy from illumination means (as a light source), whereby a temperature of the liquid crystal panel is excessively increased (e.g., as indicated by a curve D2 in FIG. 3) to lower a constant, thus failing to effect high-quality image display.

In order to solve the problem, it is necessary to maintain the liquid crystal panel in an appropriate temperature range, e.g., by using:

(1) a method wherein the liquid crystal panel is equipped with a heat dissipation mechanism to diffuse or radiate heat therefrom, or (2) a method wherein the liquid crystal panel is equipped with a heater, a cooling device and a temperature sensor to control a temperature of the liquid crystal panel.

According to the method (1), however, when the liquid crystal panel is placed in a low-temperature state, e.g., immediately after the liquid crystal panel is activated, the liquid crystal panel temperature is not readily increased due to heat dissipation by the heat dissipation mechanism although the temperature (of the liquid crystal panel) is intended to be increased to at least T1 (e.g., 45° C.) as earlier as possible (in this instance, ta is e.g., 5 min.), as indicated by a curve D3 shown in FIG. 3. As a result, a response speed of the liquid crystal is lowered, thus leading to a lower image quality.

Further, the method (1) has a constant heat dissipation effect, so that the above-mentioned heat dissipation mechanism is insufficient to lower the liquid crystal panel temperature in the case where an ambient temperature of the liquid crystal panel is too high, thus lowering a contrast and display qualities.

On the other hand, according to the above-mentioned method (2), in addition to the liquid crystal panel, it is necessary to employ various parts, such as the heater, cooling device and temperature sensor, thus resulting in an increased production cost and a large-sized apparatus.

SUMMARY OF THE INVENTION

In view of the above-mentioned problems, an object of the present invention is to provide a liquid crystal apparatus capable of suppressing a lowering in display image qualities.

Another object of the present invention is to provide a liquid crystal apparatus having solved the above problems relatively inexpensively.

A further object of the present invention is to provide a liquid crystal apparatus having solved the above problems while preventing an increase in apparatus size.

According to the present invention, there is provided a liquid crystal apparatus, comprising:

a liquid crystal panel, illumination means for illuminating the liquid crystal panel, a heat dissipation member disposed with a spacing from the liquid crystal panel, and a heat conductive member disposed between the liquid crystal panel and the heat dissipation member, wherein the heat conductive member is disposed contactable to at least one of the liquid crystal panel and the heat dissipation member and the liquid crystal apparatus further includes a heat deformation member which is disposed contactable to the heat conductive member and is deformable on receiving heat from the liquid crystal panel, so as to have the heat conductive member contact both the liquid crystal panel and the heat dissipation member thereby forming a heat conductive path between the liquid crystal panel and the heat dissipation member in a first position at a temperature of at least a prescribed temperature of the liquid crystal panel and to have the heat conductive member be separated from at least one of the liquid crystal panel and the heat dissipation member in a second position at a temperature below the prescribed temperature.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENT

Hereinbelow, preferred embodiments of the liquid crystal apparatus according to the present invention will be described with reference to FIGS. 1–3.

Figure 1:
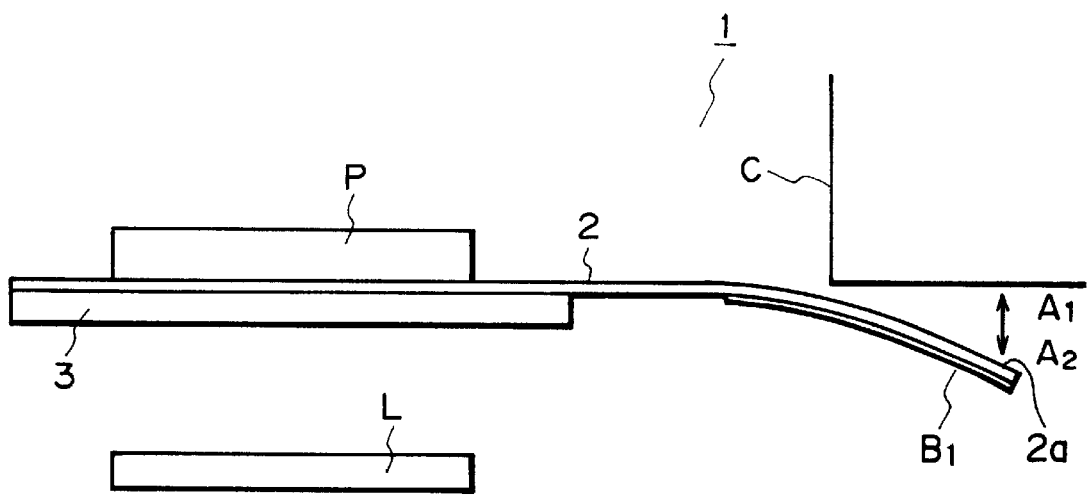
FIG. 1 is a schematic sectional view of an embodiment of the liquid crystal apparatus according to the present invention.

FIG. 1 shows an embodiment of the liquid crystal apparatus of the present invention.

Referring to FIG. 1, a liquid crystal apparatus 1 principally includes a liquid crystal panel (or device) P for displaying various information by utilizing a liquid crystal, an illumination means (as a light source) L for illuminating the liquid crystal panel P, and a heat dissipation member C having a heat capacity and an amount of heat dissipation each larger than that of the liquid crystal panel P and disposed with a spacing from the liquid crystal panel P.

The liquid crystal apparatus 1 further includes a first heat conductive member 2 disposed between the liquid crystal panel P and a support member (heat insulating member) 3 for supporting the first heat conductive member 2 and contactable to the heat dissipation member C on one side (at one end portion or contactable portion) 2a while being in contact with the liquid crystal panel P on the other side. The first heat conductive member 2 may be disposed contactable to the liquid crystal panel P while being in contact with the heat dissipation member C as shown in FIG. 2.

Further, the liquid crystal apparatus 1 includes a heat deformation member B1 disposed in contact with the first heat conductive member 2 at the portion 2a and receives heat from the liquid crystal panel P. As a result, the heat deformation member B1 is heated to have a temperature substantially equal to that of the liquid crystal panel P.

When a temperature of the liquid crystal panel P is increased to at least a prescribed temperature (e.g., at least 50° C.), the heat deformation member B1 receives heat from the liquid crystal panel P and is deformed so as to move the portion 2a of the heat conductive member 2 in a first position A1 to provide a contact state of the portion 2a with the heat dissipation member C, thus forming a heat conductive path between the liquid crystal panel P and the heat dissipation member C. As a result, heat of the liquid crystal panel is readily and effectively dissipated through the heat conductive path.

On the other hand, when the temperature of the liquid crystal panel P is below the above prescribed temperature, the portion 2a of the heat conductive member 2 is separated from the heat dissipation member C in a second position A2 to thermally insulate the heat conductive path from the heat dissipation member C. As a result, an unnecessary decrease in temperature of the liquid crystal panel P is suppressed.

In this embodiment (shown in FIG. 1), the position and shape of the heat deformation member B1 may appropriately be changed (e.g., to a heat deformation member B2 as shown in FIG. 2 described later) so long as the heat deformation member B1 deforms it shape on receiving heat from the liquid crystal panel P so as to form a heat conductive path of the liquid crystal panel P with the heat dissipation member C.

Further, it is possible to dispose a high-elasticity member between the heat deformation member B1 and the portion 2a of the heat conductive member 2, thus improving adhesion properties therebetween to enhance the heat dissipation effect at the time of contact between the portion 2a (heat conductive member 2) and the heat dissipation member C.

As the liquid crystal panel temperature rises, a pressing force of the heat deformation member B1 against the heat dissipation member C via the portion 2a. For this reason, the use of the high-elasticity member disposed between the portion 2a and the heat deformation member B1 increases a contact area between the first heat conductive member 2 and the heat dissipation member C, thus resulting in a larger heat dissipation effect. As a result it is possible to effect a better temperature control of the liquid crystal panel P. In order to further improve the heat dissipation effect, the heat dissipation member C may be preliminarily coated with a second heat conductive member (not shown) having a higher heat conductivity than the first heat conductive member 2 at the contact surface with the heat conductive member 2.

FIG. 2 shows another embodiment of the liquid crystal apparatus of the present invention.

Referring to FIG. 2, a liquid crystal apparatus 10 includes a liquid crystal panel P, a supporting member 3, a first heat conductive member 12 having a contactable portion 12a, a second heat conductive member 13, a heat insulating member 14, heat deformation members B2, and a heat dissipation member C.

In this embodiment, the second heat conductive member 13 surrounds the supporting member 3. The supporting member 3 is disposed on the liquid crystal panel P via the second heat conductive member 13 and opposite to and with a spacing from the contactable portion 12a of the first heat conductive member 12 disposed on the heat insulating member 14.

Each of the heat deformation members B2 has an arc shape and is disposed on the supporting member 3 so as to contact the second heat conductive member 13 at two terminal portions and contact the heat insulating member 14 at a central portion. On receiving heat from the liquid crystal panel P having a prescribed increased temperature via the second heat conductive member 13, the heat deformation members 1111B2 are deformed so as to decrease a spacing between the contactable portion 12a (of the first heat conductive member 12) and the second heat conductive member 13, thus finally forming a heat conductive path therebetween.

In the present invention, the heat deformation members B1 and B2 described above may, e.g., be formed of a bimetal (e.g., comprising Fe—Ni alloy and Cu—Ni—Mn alloy); curving coefficient=$20 \times 10^{-6}$ ($\deg^{-1}$) or a shape memory alloy.

The heat deformation member C may preferably comprise a member (e.g., a heat dissipation fin or a casing for the liquid crystal apparatus) having a heat capacitance and an amount of heat dissipation larger then those of the liquid crystal panel.

The first and second heat conductive members 2, 12 and 13 may preferably be a flexible sheet such as a graphite sheet or a copper film. As the flexible sheet, the graphite sheet (e.g., "Panasonic Graphite Sheet", mfd. by Matsushita Denki Sangyo K.K.) may more preferably be used. The Panasonic Graphite Sheet may generally be, e.g., a 0.1 mm-thick graphitized polymer film excellent in processability and having a heat conductive anisotropy. Accordingly, a direction of a higher heat conductivity (700 W/(m.k) which is at least 1.5 times that of the copper film) of the graphite sheet may desirably be aligned with the (extension) direction of the heat conductive path.

The illumination means L may be of a reflection-type or a transmission-type, preferably of the reflection-type.

The liquid crystal apparatus 1 and 10 may comprise a plurality of liquid crystal panels P. In this case, the liquid crystal apparatus may preferably be provided with the above-mentioned heat deformation members 2, 12 and 13 for each liquid crystal panel P.

Figure 2A:
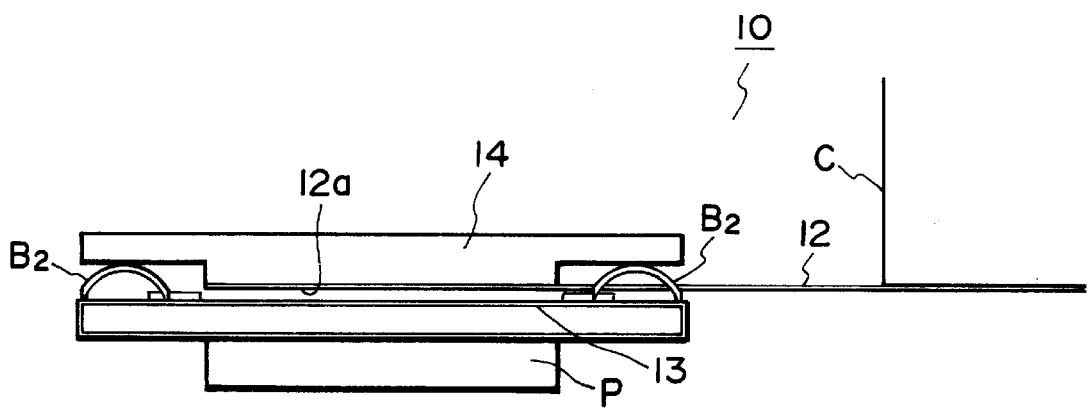
FIG. 2A is a schematic sectional view of another embodiment of the liquid crystal apparatus of the present invention and FIG. 2B is a partially enlarged view thereof.
Figure 2B:
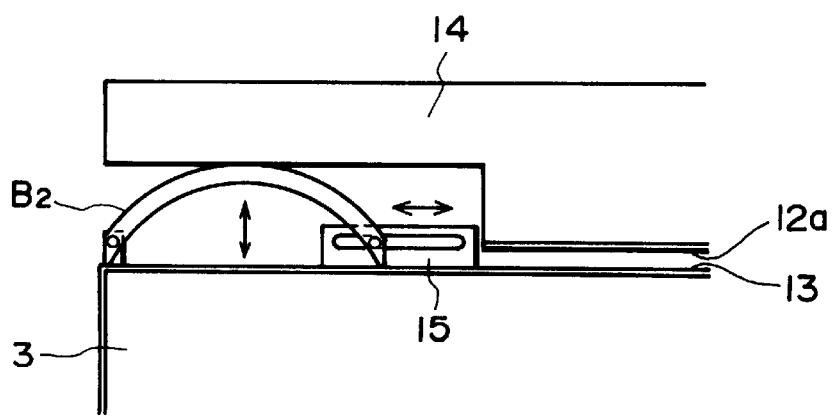
Figure 3:
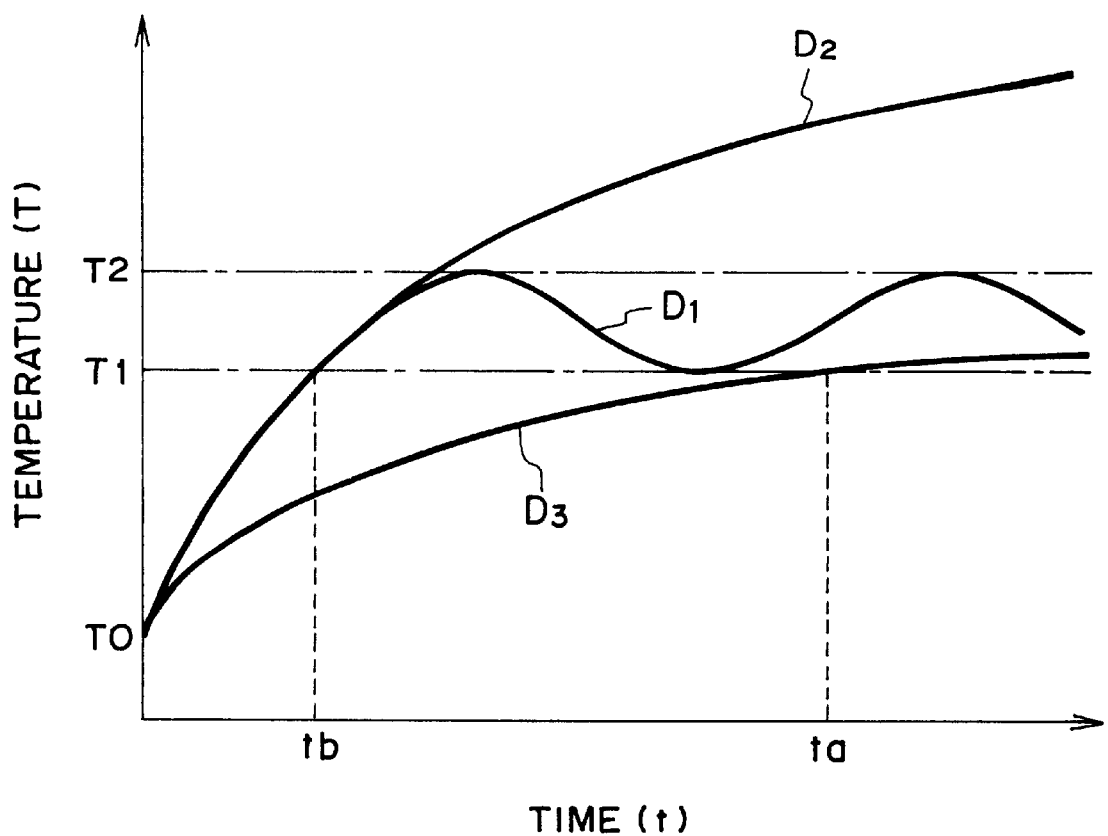
FIG. 3 is a graph showing changes in panel temperature with time of these liquid crystal panels used in the liquid crystal apparatus according to the present invention and conventional liquid crystal apparatus.

According to the above-described embodiments shown in FIGS. 1 and 2, when the liquid crystal panel temperature increases to a temperature of at least the prescribed temperature, the heat conductive path is formed between the liquid crystal panel P and the heat dissipation member C based on deformation of the heat deformation member B1 (B2) to dissipate the heat from the liquid crystal panel P, thus lowering the liquid crystal panel temperature. When the liquid crystal panel temperature decreases to a temperature below the prescribed temperature, the above-formed heat conductive path is thermally insulated from the heat dissipation member C (FIG. 1) or the liquid crystal panel (FIGS. 2A and 2B), thus preventing an excessive lowering in panel temperature of the liquid crystal panel P to suppress a lowering in response speed of the liquid crystal. As a result, the liquid crystal panel temperature may show, e.g., a curve D1 as shown in FIG. 3 wherein the panel temperature (TO: e.g., 25° C.) at a power-off state of the liquid crystal apparatus relatively quickly increases to T1 (e.g., 45° C.) in a time tb (e.g., 1 min.) from the power-on and then is kept between a certain temperature range (from T1 to T2 (e.g. 55° C.)).

As described above, the temperature of the liquid crystal panel P may effectively be kept in the prescribed temperature range (T1–T2) to stably retain good display qualities without causing a lower contrast state at an excessively high panel temperature and a lower response speed at an excessively low panel temperature.

Further, since the good display state is stably maintained as described above, it is possible to illuminate the liquid crystal panel with a higher-intensity light, thus resulting in a higher-luminance display state.

The above-mentioned temperature control mechanism can be realized by using a relatively small and inexpensive members, thus resulting in a compact and inexpensive liquid crystal apparatus when compared with the conventional liquid crystal apparatus equipped with larger and expensive members as mentioned above.

Hereinbelow, the present invention will be described more specifically based on first and second embodiment.

(Embodiment 1)

A liquid crystal apparatus according to this embodiment has a structure as shown in FIG. 1.

Referring to FIG. 1, a liquid crystal apparatus 1 includes a casing C of aluminum (contact portion) as the heat dissipation member, a liquid crystal panel (device) P (3.5× 2.7 cm) disposed and field on a supporting member (heat insulating member) 3 of Teflon (polytetrafluoroethylene) (5.5×4.7 cm) while keeping a spacing of 1 cm from the casing C.

Onto the supporting member 3, a 0.1 mm-thick flexible graphite sheet 2 (5.5×8.0 cm, "Panasonic Graphite Sheet", mfd. by Matsushita Denki Sangyo K.K.) as a heat conductive member is attached in a frame shape so as not to cover a display region (3.1×1.9 cm) of the liquid crystal panel P while keeping a contactable portion 2a spaced apart from the casing C.

Under the contactable portion 2a of the graphite sheet 2, a 0.2 mm-thick bimetal B1 (as the heat deformation member) of Fe—Ni alloy/Cu—Ni—Mn alloy (0.5×3 cm) is disposed and attached thereto, whereby the liquid crystal panel P and the bimetal B1 are kept to have a substantially identical temperature.

Further, the bimetal B1 is deformable disposed by the heat from the liquid crystal panel P via the heat conductive member 2 (with the contactable portion 2a), whereby the contactable portion 2a is movably disposed toward the casing C based on a deformation degree of the bimetal B1.

More specifically, when a liquid crystal panel temperature rises to, e.g., at least 50° C., the contactable portion 2a is moved from a position A2 to a position A1 (A1–A2: 2 mm) by the deformation of the bimetal B1 to contact the casing C, thus forming a heat conductive path between the liquid crystal panel P and the casing C. On the other hand, when the liquid crystal panel temperature decreases to, e.g., a temperature below 50° C., the contactable portion 2a is moved from the position A1 to the position A2 and thus separated from the casing C to thermally insulating the heat conductive path from the casing C. As a result, the liquid crystal panel can be kept in an appropriate operation temperature range, thus ensuring good display qualities. Further, the liquid crystal panel provides such good display qualities in ai relatively short time from the activation (start of drive) of the liquid crystal apparatus. The liquid crystal apparatus thus constructed can be produced in a compact size at relatively low costs.

(Embodiment 2)

In this embodiment, a liquid crystal apparatus 10 as shown in FIGS. 2A and 2B is prepared.

Structural members indicated by reference numerals identical to those used in Embodiment 1 are the same members as is Embodiment 1.

As shown in FIG. 2A, a 0.1 mm-thick second graphite sheet 13 ("Panasonic Graphite Sheet"; 11×5 cm; heat conductivity: 700 W/(m.k)) is attached to a supporting member 3 so as to surround the supporting member 3 and the supporting member 3 is fixed on the liquid crystal panel P.

On the supporting member 3, two bimetals B2 (heat deformation members) B2 of Fe—Ni alloy/Cu—Ni—Mn alloy are disposed at terminal portions on the surface of the supporting member 3 so as to contact the second graphite sheet 13, thus receiving heat from the liquid crystal panel P.

As shown in FIG. 2B, the bimetal B2 is rotatably supported along a fixed axis by the supporting member 3 at one terminal portion and is movably disposed in a longitudinal direction of the support member 3 at the other terminal portion along a rail 15 of aluminum. As a result, on receiving heat from the liquid crystal panel P, the bimetal B2 deforms its shape along the rail extending the longitudinal direction of the support member. The bimetal B2 is disposed in an arc shape so as to have a convex (projection) portion spaced apart from the supporting member 3.

On the bimetal B2, a heat insulating member 14 of Teflon is held at a central portion of the bimetal B2. The heat insulating member 14 has a projection portion closer to the second graphite sheet (heat conductive member) 13 and is partially coated with a 0.1 mm-thick first graphite sheet ("Panasonic Graphite Sheet") 12 (700 W/(m.k)) at the projection portion, thus providing a contactable portion 12a with the first graphite sheet 12. The contactable portion 12a confronting the second graphite sheet 13 is movable toward the surface of the second graphite sheet 13 depending on a degree of the deformation of the arc-shaped bimetal B2. Accordingly, the contactable portion 1a of the first graphite sheet 12 is thermally connectable to the liquid crystal panel P via the second graphite sheet 13 surrounding the supporting member 3.

The other terminal portion of the first graphite sheet 12 is extended to the casing C and is attached to the casing C at the portion.

When the liquid crystal panel P increases its temperature to a temperature of at least a prescribed temperature (e.g., at least 50° C.), the contactable portion 12a of the first graphite sheet 12 is moved downward to contact the second graphite sheet 13 since the bimetals B2 are deformed so as to minimize the spacing between the first and second graphite sheets 2 (12a) and 13. As a result, a heat conductive path is formed between the liquid crystal panel P and the casing C via the first and second graphite sheets 12 (12a) and 13, thus effectively dissipating heat from the liquid crystal panel.

When the liquid crystal panel temperature decreases to a temperature below the prescribed temperature, the deformed bimetals B2 are restored to those in the arc shape to move upward the contactable portion 12a, thus electrically insulating and separating the heat conductive path from the liquid crystal panel P.

According to this embodiment (Embodiment 2), it is possible to achieve the similar effects as Embodiment 1.

In the present invention, the above-described structural members constituting the liquid crystal apparatus may appropriately be modified in their sizes, positions, shapes, and materials so long as the above-described good temperature control operation for the liquid crystal panel used in ensured based on the thermally deformable function of the heat deformation member(s).

What is claimed is:

1. A liquid crystal apparatus, comprising:

a liquid crystal panel, illumination means for illuminating the liquid crystal panel, a heat dissipation member disposed with a spacing from the liquid crystal panel, and a heat conductive member disposed between the liquid crystal panel and the heat dissipation member, wherein the heat conductive member is disposed contactable to at least one of the liquid crystal panel and the heat dissipation member and the liquid crystal apparatus further includes a heat deformation member which is disposed contactable to the heat conductive member and is deformable on receiving heat from the liquid crystal panel, so as to have the heat conductive member contact both the liquid crystal panel and the heat dissipation member thereby forming a heat conductive path between the liquid crystal panel and the heat dissipation member in a first position at a temperature of at least a prescribed temperature of the liquid crystal panel and to have the heat conductive member be separated from at least one of the liquid crystal panel and the heat dissipation member in a second position at a temperature below the prescribed temperature.

2. An apparatus according to claim 1, wherein the heat conductive member is disposed contactable to the heat dissipation member while being in contact with the liquid crystal panel.

3. An apparatus according to claim 2, wherein the heat deformation member is disposed in contact with the heat conductive member.

4. An apparatus according to claim 1, wherein the heat conductive member is disposed contactable to the liquid crystal panel while being in contact with the heat dissipation member.

5. An apparatus according to claim 1, wherein the heat deformation member is disposed so as to receive heat from the liquid crystal panel and be supported by a heat insulating member.

6. An apparatus according to claim 5, which further includes another heat conductive member disposed between the heat conductive member and the liquid crystal panel so as to allow a contact between the heat conductive member and said another heat conductive member.

7. An apparatus according to any one of claims 1–6, wherein the heat deformation member comprises a bimetal.

8. An apparatus according to any one of claims 1–6, wherein the heat deformation member comprises a. shape memory alloy.

9. An apparatus according to any one of claims 1–6, wherein the heat dissipation member has a heat capacity larger than that of the liquid crystal panel.

10. An apparatus according to any one of claims 1–6, wherein the heat dissipation member has an amount of heat dissipation larger than that of the liquid crystal panel.

11. An apparatus according to any one of claims 1–6, wherein the heat conductive member comprises a flexible sheet.

12. An apparatus according to claim 11, wherein the flexible sheet is a graphite sheet.

13. An apparatus according to claim 6, wherein said another heat conductive member comprises a flexible sheet.

14. An apparatus according to claim 13, wherein the flexible sheet is a graphite sheet.

* * * * *

UNITED STATES PATENT AND TRADEMARK OFFICE
CERTIFICATE OF CORRECTION

PATENT NO. : 6,333,772 B1
DATED : December 25, 2001
INVENTOR(S) : Shigeki Mori et al.

It is certified that error appears in the above-identified patent and that said Letters Patent is hereby corrected as shown below:

Column 1,
Line 27, "device)" should read -- (device) --.

Column 4,
Line 66, "(TO:" should read -- (T0: --.

Column 5,
Line 45, should not begin a new paragraph.

Column 6,
Line 51, "sheets 2" should read -- sheets 12 --.

Column 8,
Line 4, "claim 1," should read -- claim 4, --;
Line 16, "a." should read -- a --.

Signed and Sealed this

Thirteenth Day of August, 2002

Attest:

*Attesting Officer*

JAMES E. ROGAN
*Director of the United States Patent and Trademark Office*